(12) United States Patent
Kim et al.

(10) Patent No.: US 8,223,933 B2
(45) Date of Patent: Jul. 17, 2012

(54) LINE INTERFACE UNIT OF MULTIFUNCTION PRINTER AND FACSIMILE

(75) Inventors: Yun Tae Kim, Suwon-si (KR); Jeong Baek Lee, Suwon-si (KR); Jong Cheol Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1359 days.

(21) Appl. No.: 11/845,192

(22) Filed: Aug. 27, 2007

(65) Prior Publication Data
US 2008/0095341 A1    Apr. 24, 2008

(30) Foreign Application Priority Data
Oct. 20, 2006   (KR) ................. 10-2006-0102528

(51) Int. Cl.
*H04M 11/00*   (2006.01)

(52) U.S. Cl. ................ 379/100.06; 379/93.05
(58) Field of Classification Search . 379/100.01–100.17
See application file for complete search history.

(56) References Cited

U.S. PATENT DOCUMENTS

| | | | | |
|---|---|---|---|---|
| 4,773,080 A | * | 9/1988 | Nakajima et al. | 375/216 |
| 5,018,189 A | * | 5/1991 | Kurosawa et al. | 379/93.01 |
| 5,524,047 A | * | 6/1996 | Brown et al. | 379/93.11 |
| 5,822,407 A | * | 10/1998 | Ohtani | 379/100.15 |
| 5,841,843 A | * | 11/1998 | Bristow et al. | 379/100.09 |
| 5,870,465 A | * | 2/1999 | Hosbach et al. | 379/419 |

FOREIGN PATENT DOCUMENTS

KR    10-131159    11/1997

* cited by examiner

*Primary Examiner* — Simon Sing
(74) *Attorney, Agent, or Firm* — Staas & Halsey LLP (57) ABSTRACT

A line interface unit in which a circuit to detect a calling line and a ring signal includes a connecting unit connected to a public switched telephone network (PSTN) to individually detect the calling line and the ring signal and to commonly use an insulating circuit electrically insulated from PSTN. A circuit to detect the calling line and the ring signal is simply implemented so that economical burden can be reduced.

26 Claims, 4 Drawing Sheets

FIG 3A  PSTN

LINE INTERFACE UNIT OF MULTIFUNCTION PRINTER AND FACSIMILE

CROSS-REFERENCE TO RELATED APPLICATION

This application claims the benefit of Korean Application No. 2006-102528, filed Oct. 20, 2006 in the Korean Intellectual Property Office, the disclosure of which is incorporated herein by reference.

BACKGROUND OF THE INVENTION

1. Field of the Invention

Aspects of the present invention relate to a line interface unit of a multifunction printer, and more particularly, to a line interface unit of a multifunction printer in which duplicated parts of a circuit to detect a calling line and a circuit to detect a ring signal is improved and easily implemented.

2. Description of the Related Art

A multifunction printer having functions of scanning an image and transmitting and receiving fax data, which are added to a printer, is being developed. In order to perform a facsimile function in the multifunction printer, a communication line is formed using a telephone connecting apparatus to connect the multifunction printer to a public switched telephone network.

Figure 1:
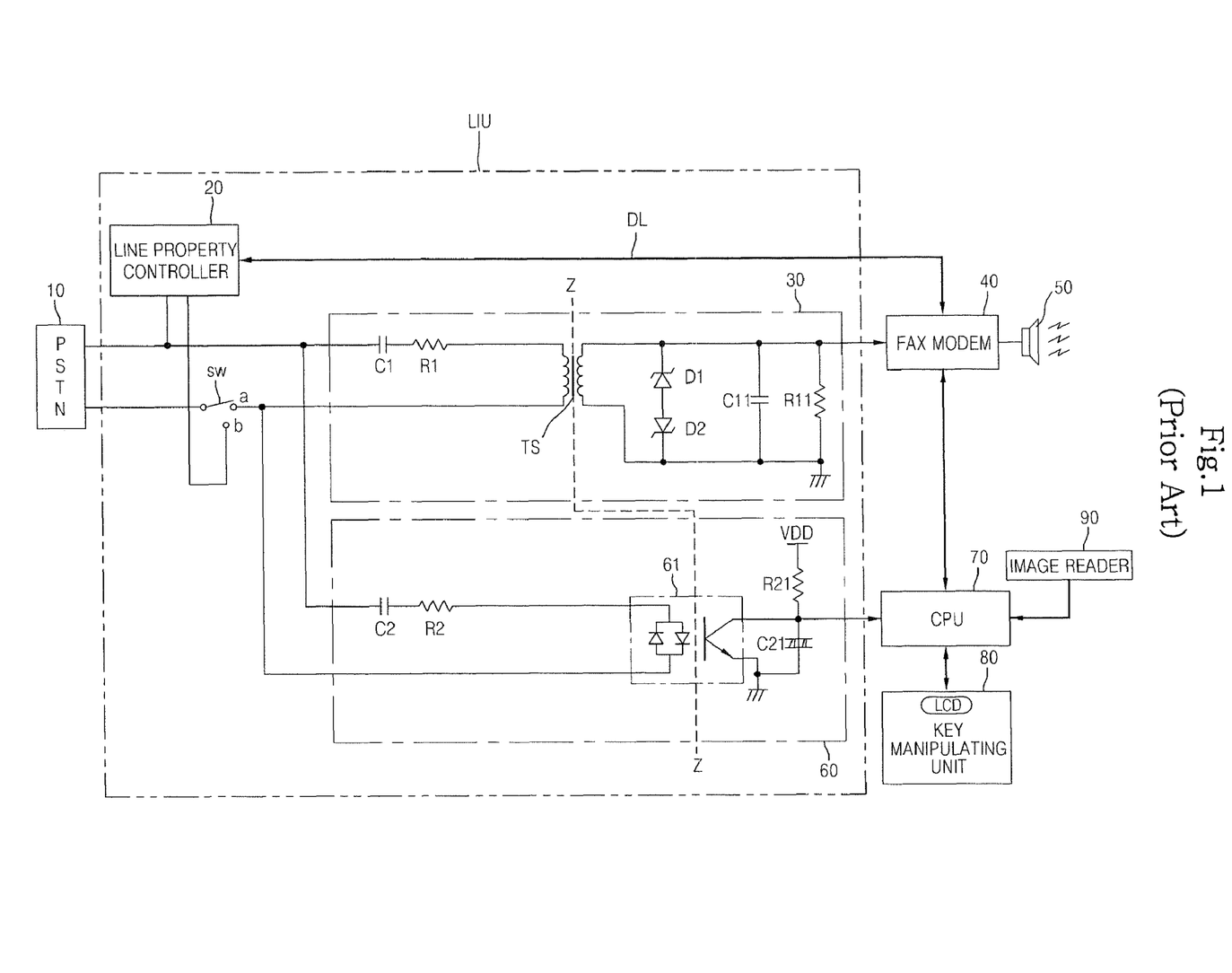
FIG. 1 shows an electric circuit illustrating a line interface unit of a conventional multifunction printer.

As illustrated in FIG. 1, a conventional telephone connecting apparatus of a multifunction printer includes a public switched telephone network 10, a line interface unit/connecting unit (LIU), a facsimile modem 40 to transmit and receive fax data, an audio outputting unit 50 to output a ring signal, a central controller (CPU) 70, an image reader 90 to scan and provide an image to the central controller 70, and a manipulating panel 80. The manipulating panel 80 may include a key manipulating unit for a user to input a command and a liquid crystal display (LCD) to display operating state and setting state.

The connecting unit LIU includes a line property controller 20, a line switch SW, a calling line detecting unit 30, and a ring signal detecting unit 60. The line property controller 20 is connected to the public switched telephone network 10 and to the facsimile modem 40 through a data line DL. The switch SW changes between a first contact a and a second contact b. In an ON-Hook mode, the line switch SW contacts the first contact a and is set to an idle mode. In the OFF-Hook mode, the line switch SW contacts the second contact b, is set to a handset mode.

The calling line detecting unit 30 is connected between the public switched telephone network 10 and the facsimile modem 40. The calling line detecting unit 30 detects a calling line to be transmitted from the public switched telephone network 10 at the idle mode to provide the detected calling line to the facsimile modem 40. The facsimile modem 40 identifies the detected calling line and provides information of the calling line to the central controller 70.

The ring signal detecting unit 60 is connected between the public switched telephone network 10 and the central controller 70. The ring signal detecting unit 60 detects the ring signal transmitted from the public switched telephone network 10 at the idle mode to provide the detected ring signal to the central controller 70. The central controller 70 notifies the ring signal to the facsimile modem 40 when receiving the detected ring signal such that the audio outputting unit 50, connected to the facsimile modem 40, audibly outputs the ring signal.

When the number of times of detecting the ring signal reaches a predetermined number of times, a facsimile receiving mode of receiving the facsimile data is set. At this time, the facsimile modem 40 receives the facsimile data through the data line DL. After the facsimile data is received prints the received data is printed using a printer driving unit (not shown) controlled by the central controller 70.

The calling line detecting unit 30 includes a transformer TS to electrically separate a primary coil connected to the public switched telephone network 10 from a secondary coil connected to the facsimile modem 40. The primary coil of the transformer TS is connected in series to a first capacitor C1 and a first resistor R1 to match the impedance of the telephone/calling line. The secondary coil of the transformer TS is connected in parallel to diodes D1 and D2 to prevent a surge voltage. The diodes D1 and D2 are connected in parallel to a capacitor C11 to remove noise and a resistor R11 to match the input impedance.

The ring signal detecting unit 60 includes a phototransistor 61 having a primary side and a secondary side, the primary side being electrically separated from the secondary side. The primary side is connected to the public switched telephone network 10 and the secondary side is connected to the central controller 70. A light emitting port of the phototransistor 61 is connected in series to a second capacitor C2 and a second resistor R2 to match the impedance of the telephone/calling line. A light receiving port of the phototransistor 61 is connected to a resistor R21 and a capacitor C21 to change a signal waveform such that the central controller 70 can exactly recognize the ring signal.

According to the conventional line interface unit (LIU) of the multifunction printer, the input sides of the calling line detecting unit 30 and the ring signal detecting unit 60 are connected to the public switched telephone network 10, but the output sides thereof are individually connected to the facsimile modem 40 and the central controller 70, respectively. Since the calling line detecting unit 30 and the ring signal detecting unit 60 have a similar structure in view of electrically insulating the input sides and the output sides along the reference lines Z-Z and share the input sides thereof, it is required to improve the structure duplicated due to the similar components for a simpler structure.

SUMMARY OF THE INVENTION

Aspects of the present invention provide a line interface unit of a multifunction printer in which a circuit to detect a calling line and a ring signal is simply implemented to reduce economical burden.

Additional aspects and/or advantages of the invention will be set forth in part in the description which follows and, in part, will be obvious from the description, or may be learned by practice of the invention.

In accordance with one aspect of the present invention, a line interface unit of a multifunction printer includes: a public switched telephone network; a connecting unit connected to the public switched telephone network to detect a first signal and a second signal; a facsimile modem connected to the connecting unit to receive the detected first signal; and a controller connected to the connecting unit to receive the detected second signal; wherein the connecting unit individually detects the first and second signals by commonly using an insulating circuit electrically insulated from the public switched telephone network.

According to an aspect of the invention, the first signal is a calling line, and the second signal is a ring signal.

According to an aspect of the invention, the controller notifies the detection of the second signal to the facsimile modem.

According to an aspect of the invention, the insulating circuit includes a transformer having a primary coil connected to the public switched telephone network and a secondary coil connected to the facsimile modem.

According to an aspect of the invention, the connecting unit includes a calling line detecting unit having the insulating circuit and a ring signal detecting unit without the insulating circuit, and the ring signal detecting unit is connected to an output side of the calling line detecting unit.

According to an aspect of the invention, the ring signal detecting unit includes an amplifying device to amplify the ring signal.

According to an aspect of the invention, the amplifying device is a transistor.

According to an aspect of the invention, the ring signal detecting unit further includes a resistor and a capacitor to change a waveform of the signal amplified by the amplifying device.

According to an aspect of the invention, the connecting unit includes a calling line detecting unit to detect the calling line to provide the detected calling line to the facsimile modem, and a ring signal detecting unit connected to the output side of the calling line detecting unit to provide the detected ring signal to the controller.

In accordance with another aspect of the present invention, a line interface unit of a multifunction printer includes: a public switched telephone network; a first detecting unit connected to receive at least two signals from the public switched telephone network and to provide the input signals to an electrically insulated output side using an insulating circuit insulated from the public switched telephone network; a second detecting unit connected to the output side of the first detecting unit to detect a ring signal outputted through the insulating circuit; and a controller to set an operating mode based on the number of times when the ring signal is detected by the second detecting unit.

According to an aspect of the invention, the second detecting unit includes a transistor to amplify the ring signal, and a resistor and a capacitor to change a waveform of the amplified signal such that the controller easily recognizes the amplified signal.

According to an aspect of the invention, the line interface unit further includes a facsimile modem to receive a calling line detected by the first detecting unit, and the second detecting unit is branched at a connecting node between the first detecting unit and the facsimile modem to be connected to the controller.

In accordance with another aspect of the present invention, a line interface unit of a facsimile includes a public switched telephone network; and a connecting unit connected between the facsimile and the public switched telephone network to perform bidirectional communication, to detect a calling line and a ring signal that are transmitted from the public switched telephone network, and to commonly use an insulating circuit electrically insulated between the facsimile and the public switched telephone network for the signal detection.

In accordance with another aspect of the present invention, a line interface unit of a multifunction printer includes an image acquiring device to acquire an image by scanning the image, including: a public switched telephone network; and a line connecting unit connected between the public switched telephone network and the facsimile, wherein the line connecting unit includes a plurality of connecting devices to individually detect a calling line and a ring signal, an insulating circuit is provided in a first detecting device to detect the calling line, and electrically insulates the public switched telephone network and the facsimile modem, and a second detecting device to detect the ring signal is connected to an output side of the first detecting device.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the detailed description, a multifunction printer having a function of receiving facsimile data and printing the same and including an image forming apparatus will be described. However, it is understood that aspects of the present invention can be applied to a facsimile without the image forming apparatus, electrically connected to a public switched telephone network to transmit and receive the facsimile data. Since the facsimile portion is an apparatus in which the image forming apparatus is removed, the facsimile will not be described in detail in the detailed description of the embodiments.

In brief technical aspects of the present invention, the present invention can be applied to an apparatus having a function of being connected to a public switched telephone network to communicate. As the apparatus, there are a multifunction printer including an image forming apparatus, a facsimile without the image forming apparatus, a multifunction printer without the image forming apparatus but having a facsimile function added to a printer, and the like. It is understood that, while described in terms of a public switched telephone network, aspects of the invention can be implemented in other networks, such as cell or VOIP networks, in addition to or instead of public switched telephone networks.

Figure 2:
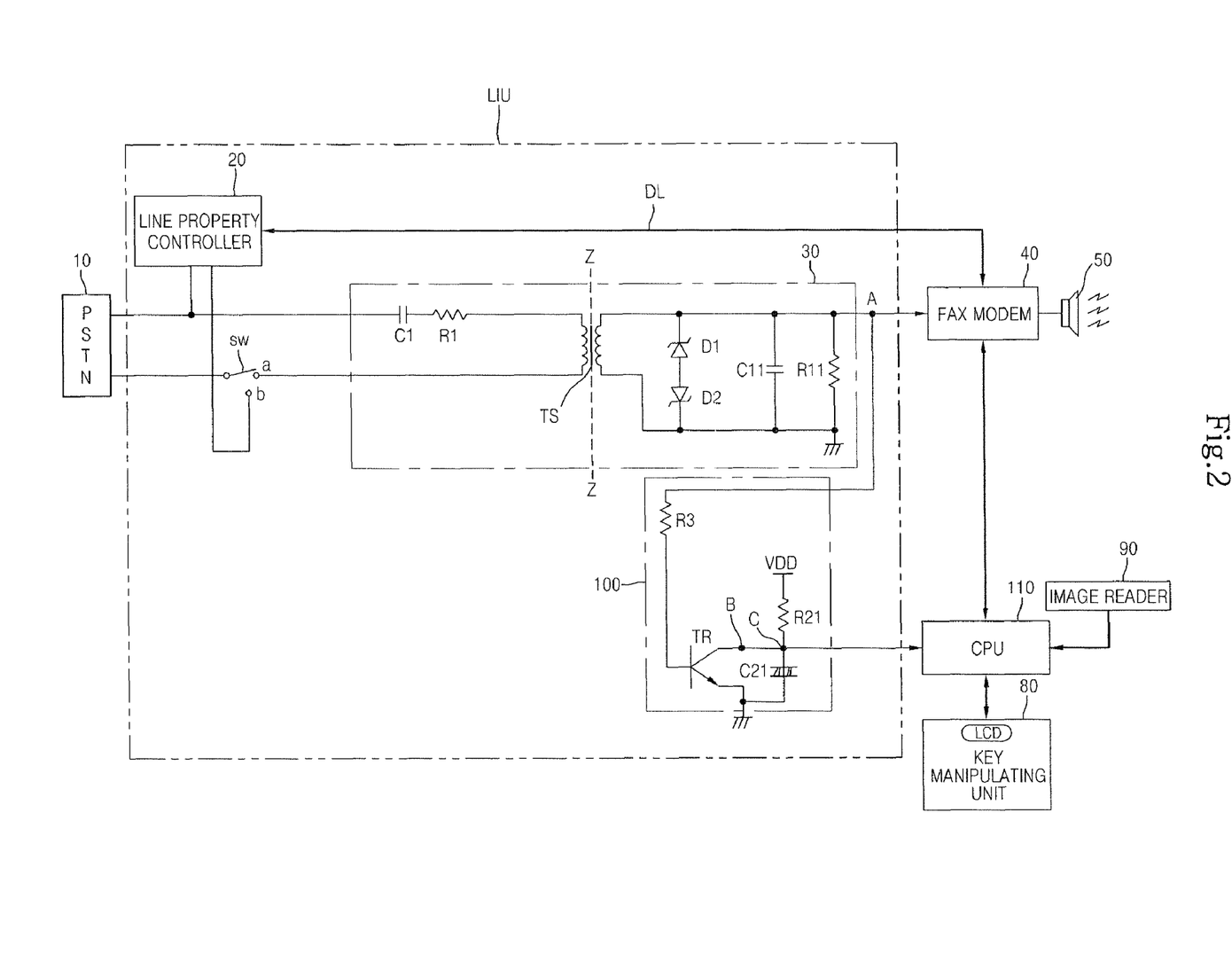
FIG. 2 shows an electric circuit illustrating a line interface unit of a multifunction printer, according to an embodiment of the present invention.

The telephone connecting apparatus according to an embodiment of the present invention, as illustrated in FIG. 2, includes a public switched telephone network 10, a facsimile modem 40, an audio outputting device 50, an image reader 90, and a manipulating panel 80. A line interface unit (LIU) is connected to the public switched telephone network 10 to perform bidirectional communication to detect at least two signals. While described as including the public switched telephone network 10, it is understood that the telephone connecting apparatus includes a connection compatible with communicating across the public switched telephone network 10. It is understood that ones of the shown devices need not be used in all aspects such as where no image reader 90 is used or the panel 80 is incorporated in a display. Further, it is understood that other devices can be included, such as a telephone handset to allow voice communication in addition to the facsimile transmission.

The at least two detected signals includes a calling line to indicate information of caller and a ring signal. However, it is understood that other signals can be used such that the number is not limited to two.

The shown line interface unit LIU is substantially identical to the conventional one shown in FIG. 1. Specifically, the line interface unit LIU includes a line property controller 20, a line switch SW, a calling line detector 30. Moreover, the line interface unit LIU according to the shown embodiment of the present invention is characterized in that a ring signal detecting circuit to detect the ring signal is improved.

As compared to the ring signal detecting unit 60 of FIG. 1, the improved ring signal detecting unit 100 does not include an insulating circuit, and is connected to an output side of the calling line detector 30 to provide the detected ring signal to a central controller 110. The ring signal transmitted from the public switched telephone network 10 is transmitted to the calling line detector 30 and is detected by the ring signal detecting unit 100.

The calling line detector 30 includes a transformer TS that is connected between the public switched telephone network 10 and the facsimile modem 40. The transformer TS has a primary coil connected to the public switched telephone network 10 and a secondary coil connected to the facsimile modem 40. The primary and secondary coils are electrically separated along the reference line Z-Z. The primary coil of the transformer TS is connected in series to a first capacitor C1 and a first resistor R1 to match the impedance of the telephone/calling line. The secondary coil of the transformer TS is connected in parallel to diodes D1 and D2 to prevent a surge voltage, a capacitor C11 to remove noise, and a resistor R11 to match the input impedance. However, it is understood that, while shown as the transformer TS, a phototransistor such as that shown in FIG. 1, a photo-coupler or other electrical insulating devices can be used in other aspects of the invention.

The line-switch SW is selectively connectable to a first contact a and to a second contact b. In the ON-Hook mode, the line switch SW contacts the first contact a and is set to an idle mode. In the OFF-Hook mode, the line switch SW contacts the second contact b and is set to a handset mode. In the idle mode, the calling line is not being used, such as where a handset otherwise used to make a phone call is not being used or where facsimile data is not being sent over the calling line. In the handset mode, the calling line is being used, such as when the handset is being used or where facsimile data is being sent over the calling line. However, it is understood that, if there is no handset, the line switch SW need not be used.

The calling line detecting unit 30 detects the calling line transmitted from the public switched telephone network 10 at the idle mode to provide the detected calling line to the facsimile modem 40. The facsimile modem 40 responds to the detected calling line and provides information of the detected calling line to the central controller 110.

An output side of the calling line detector 30 is connected to the improved ring signal detecting unit 100 at contact A, which is between the output side of the calling line detector 30 and an input side of the facsimile modem 40. The ring signal detecting unit 100 has a side connected to the output side of the calling line detector 30 before the fax modem 40. The other side thereof connected to the central controller 110.

The improved ring signal detecting unit 100 includes a transistor TR. A base of the transistor TR is connected via a pull-up resistor R3 to the contact A. A resistor R21 is connected to a collector of the transistor TR. A capacitor C21 of the transistor TR is connected between the collector and an emitter of the transistor TR.

Since the contact A is positioned at the secondary coil of the transformer TS, the transistor TR connected to the contact A is electrically insulated from the primary coil of the transformer TS. In other words, the ring signal detecting unit 100 is connected to the secondary coil of the transformer TS that is electrically insulated from the public switched telephone network 10.

Figures 3A, 3B:
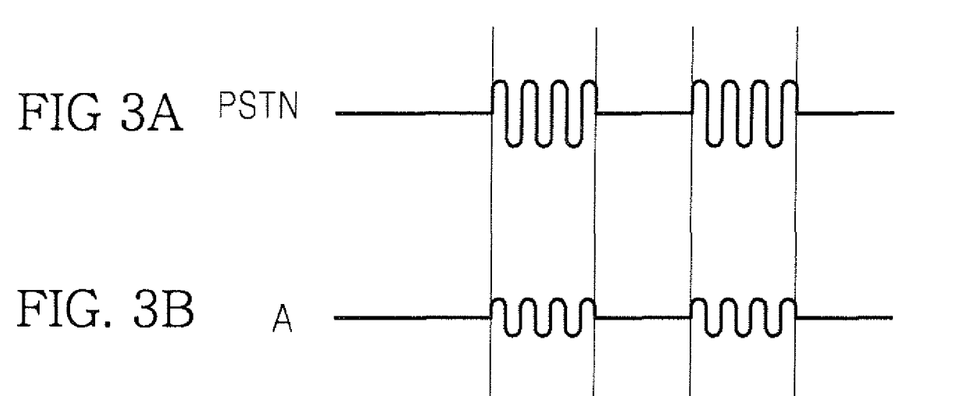
FIGS. 3A, 3B, 3C, and 3D are graphs illustrating waveforms of signals at respective locations in FIG. 2.
Figure 3C:
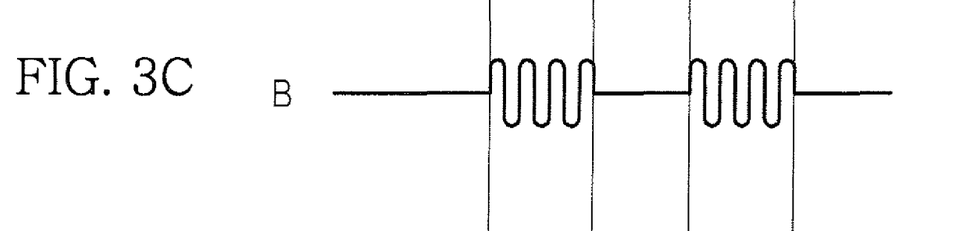

The transistor TR amplifies and outputs the ring signal transmitted through the contact A. A waveform of a signal at the contact A, as illustrated in FIG. 3B, is the same as a ring signal transmitted from the public switched telephone network 10 as shown in FIG. 3A in view of a type of signal, but has attenuated signal level. The attenuation of the ring signal is carried out when the ring signal passes through the transformer TS of the calling line detector 30. A waveform of a signal at an output side, amplified by the transistor TR, comes out at contact B as an output signal shown in FIG. 3C. As such, FIG. 3C is substantially similar to the signal of the public switched telephone network 10 shown in FIG. 3A. The resistor R21 and the capacitor C21 change the waveform of the signal such the central controller 100 can easily recognize the amplified signal. The waveform of the signal at a contact C between the resistor R21 and the capacitor C21 is changed into a waveform shown in FIG. 3D of distinguishing an ON-region and an OFF-region of the ring signal. The central controller 110 receiving the signal recognizes that the ring signal is inputted. However, it is understood that the waveforms need not be amplified and/or transformed in all aspects of the invention.

As shown, the manipulating panel 80 includes a liquid crystal display (LCD) which displays caller information for a call made on the calling line. Specifically, after the ring signal detecting unit 100 detects the ring signal and the calling line detector 30 detects the calling line, the facsimile modem 40 identifies the calling line information. The central controller 110 receives the identified calling line information and controls the LCD to display the caller information regarding the calling line. Examples of the caller information include a phone number and/or the identity of the caller. However, it is understood that, in order aspects of the invention, the LCD need not be used, the caller information need not be displayed, and/or that other displays can be used.

Meanwhile, the central controller 110 determines whether the ring signal is inputted or not based on the ring signal detected by the ring signal detecting unit 100. The controller 110 sets a receiving mode to receive the facsimile data when the number of times of detecting the ring signal is equal to or greater than a predetermined number (for example, two). When the receiving mode is set, the facsimile modem 40, connected to the line property controller 20 through the data line DL, receives the facsimile data and performs an operation of printing the received data using a printer driving unit (not shown) according to a control of the central controller 70. However, it is understood that the received facsimile data could be stored and/or forwarded across a network instead of or in addition to being printed by a printer.

Figure 3D:
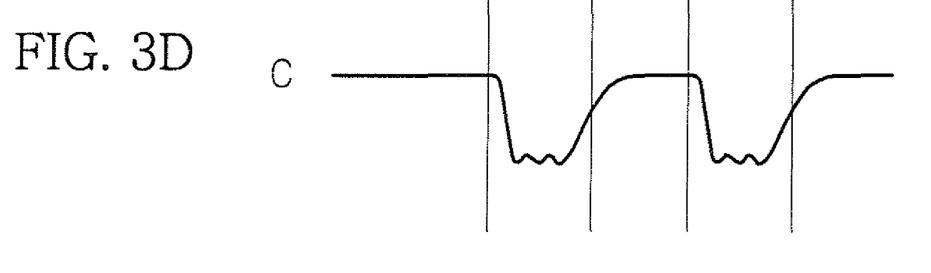
Figure 4:
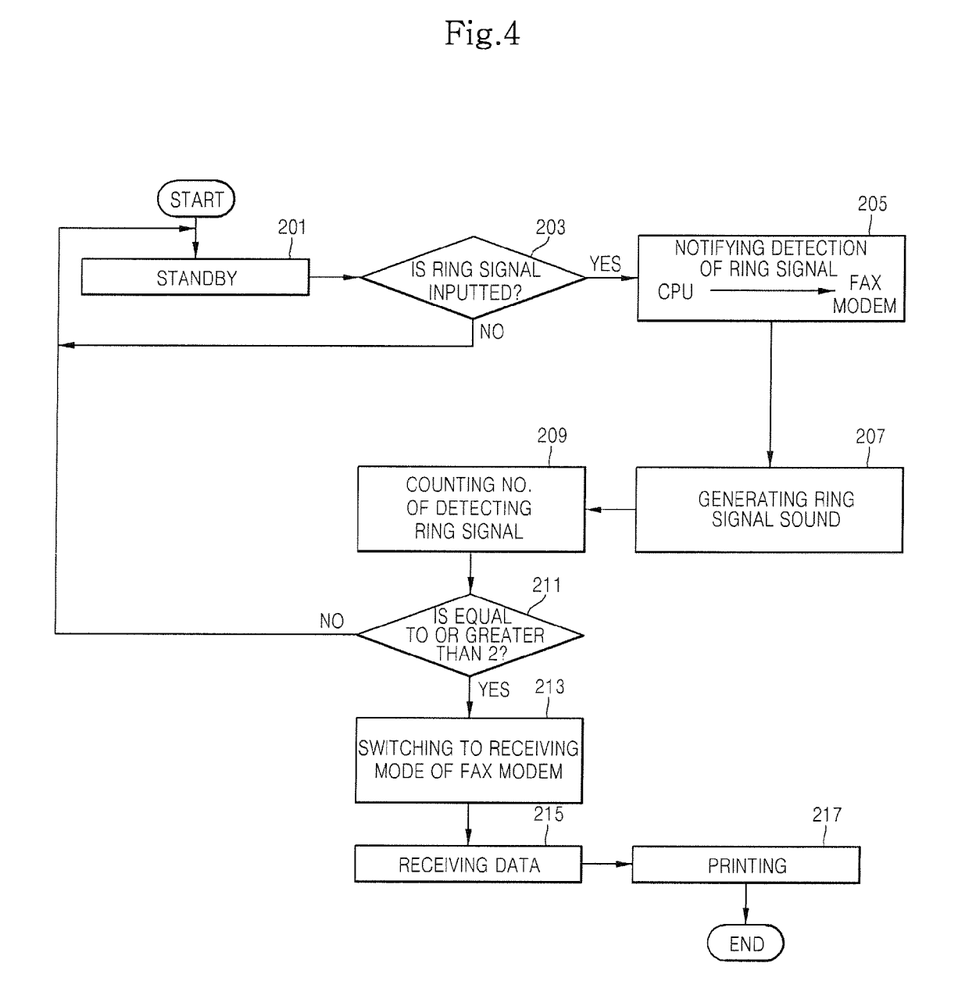
FIG. 4 is a flowchart illustrating an operation of printing facsimile data based on a ring signal detected using the line interface unit of a multifunction printer according to an embodiment of the present invention.

Hereinafter, operation of the line interface unit LIU of a multifunction printer according to an embodiment of the present invention will be described with reference to the FIGS. 2 through 4. When power is applied, an initialization is performed. After initialization, the idle mode/standby mode is set to wait for the ring signal to be input of (201).

In the idle mode, the ring signal detecting unit 100 amplifies the ring signal inputted through the contact A, changes the waveform thereof and supplies the amplified and changed ring signal to the central controller 110. The central controller 110 determines whether the ring signal is detected (namely, the ring signal is received) (203). If no ring signal is detected in operation 203, the apparatus remains in the standby mode and operation 201 is repeated. If the ring signal is detected in operation 203, the controller 110 notifies the facsimile modem 40 of the detection of the ring signal (205). In response to this notification, the facsimile modem 40 generates a ring signal sound through the audio outputting unit 50 (207). However, it is understood that, in other aspects of the invention, operation 207 is not performed, such as where the ring signal sound is muted, or where the audio outputting unit 50 is not be included such that the audio cannot be output.

The central controller 110 counts the number of times the ring signal is detected (209). In operation 211, the central controller 100 determines whether the number of times is equal to or greater than the predetermined number (for example two times). If the central controller 100 determines that the number of times is less than the predetermined number in operation 211, the control controller 100 performs operation 201 again in order to continue the detection of the ring signal. However, it is understood that, where a dedicated line is used for faxes or where the predetermined number is 0, operations 209 and/or 211 can be omitted.

If the central controller 100 determines in operation 211 that the number of times is equal to or greater than the predetermined number, the central controller 110 sets the facsimile receiving mode (213). Due to this mode, the facsimile modem 40 receives the facsimile data from the line property controller 20 (215) and provides the received facsimile data to the printer driving unit (not shown) to perform the printing (217).

As described above, according to aspects of the present invention, in an apparatus connected to the public switched telephone network to perform bidirectional communication, a circuit to detect a ring signal can be easily and simply implemented by a small number of components in comparison to the conventional circuit. Particularly, according to aspects of the present invention, since an insulating circuit can be commonly used to detect plural signals, an expensive photo-coupler to electrically insulate can be removed, and manufacturing costs can be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A line interface unit of a multifunction printer connected to a public switched telephone network, the line interface unit comprising:
   a public switched telephone network connector;
   a connecting unit connected to the public switched telephone network via the public switched telephone network connector to detect a first signal and a second signal, the connecting unit including an insulating circuit which is electrically insulated from the public switched telephone network and individually detects both the first and second signals;
   wherein the connecting unit commonly uses the insulating circuit for the signal detection of both the first and second signals;
   a facsimile modem connected to the connecting unit to receive the detected first signal detected by the insulating circuit; and
   a controller connected to the connecting unit to receive the detected second signal detected by the insulating circuit.

2. The line interface unit according to claim 1, wherein the first signal is a calling line and the second signal is a ring signal.

3. The line interface unit according to claim 1, wherein the controller notifies the detection of the second signal to the facsimile modem.

4. The line interface unit according to claim 1, wherein: the insulating circuit comprises a transformer having a primary coil connected to the public switched telephone network and a secondary coil connected to the facsimile modem.

5. The line interface unit according to claim 1, wherein:
   the connecting unit comprises a calling line detecting unit having the insulating circuit to detect the first signal used by the facsimile modem and a ring signal detecting unit which does not include the insulating circuit and detects the second signal used by the controller, and
   the ring signal detecting unit is connected to an output side of the calling line detecting unit.

6. The line interface unit according to claim 5, wherein the ring signal detecting unit comprises an amplifying device to amplify the ring signal.

7. The line interface unit according to claim 6, wherein the amplifying device comprises a transistor.

8. The line interface unit according to claim 6, wherein the ring signal detecting unit further comprises a resistor and a capacitor to change a waveform of the signal amplified by the amplifying device.

9. The line interface unit according to claim 2, wherein the connecting unit comprises:
   a calling line detecting unit to detect a calling line to provide the detected calling line to the facsimile modem; and
   a ring signal detecting unit connected to an output side of the calling line detecting unit to provide a detected ring signal to the controller.

10. A line interface unit of a multifunction printer connected to a public switched telephone network, the line interface unit comprising:
    a public switched telephone network connector;
    a first detecting unit connected to receive input signals from the public switched telephone network via the public switched telephone network connector and to provide the input signals to an output side of an insulating circuit having an input side connected to the public switched telephone network connector and where the output side is electrically insulated from the public switched telephone network;
    a second detecting unit connected to an output side of the first detecting unit to detect a ring signal from one of the input signals provided through the electrically insulated output side of the insulating circuit; and
    a controller to set an operating mode of the line interface unit based on a number of times the ring signal is detected by the second detecting unit.

11. The line interface unit according to claim 10, wherein the second detecting unit comprises:
    a transistor to amplify the ring signal; and a resistor and a capacitor to change a waveform of the amplified ring signal such that the controller recognizes the amplified ring signal.

12. The line interface unit according to claim 11, further comprising a facsimile modem to receive a calling line as another one of the input signals detected by the first detecting unit, wherein the second detecting unit is branched at a connecting node between the first detecting unit and the facsimile modem and is connected between the connecting node and the controller.

13. A line interface unit of a facsimile connected to a public switched telephone network, the line interface unit comprising:
    a public switched telephone network connector; and
    a connecting unit connected between the facsimile and the public switched telephone network connector to perform bidirectional communication using the public switched telephone network, to detect a calling line and a ring signal that are transmitted from the public switched telephone network, and to commonly use an insulating circuit electrically insulated between the facsimile and the public switched telephone network for the signal detection of both the calling line and the ring signal.

14. A line interface unit of an image acquiring device to acquire an image by scanning the image, the line interface unit comprising:
    a public switched telephone network connector; and
    a line connecting unit connected between the public switched telephone network connector and the image acquiring device, the line connecting unit comprising:
        a plurality of connecting devices to individually detect a calling line and a ring signal;
        an insulating circuit provided in a first one of the detecting devices to detect the calling line, and electrically insulate the public switched telephone network and the image acquiring device; and
        a second one of the detecting devices to detect the ring signal and which is connected to an output side of the first detecting device.

15. A line interface unit of a facsimile unit connected to a network, the line interface unit comprising:
    an insulating circuit having an input side at which the network is connected, and an output side that is electrically insulated from the input side, the output side to output a first signal to the facsimile unit to detect a communication line through which facsimile data is sent across the network; and
    a detecting unit connected between the facsimile unit and an output of the insulating circuit to receive the first signal, to detect a second signal from the received first signal, and to output the detected second signal to a controller to set an operating mode of the facsimile unit to receive the facsimile data using the detected communication line based on the detected second signal.

16. The line interface unit according to claim 15, wherein the detecting unit amplifies the received first signal and changes a waveform of the amplified first signal to form the second signal.

17. The line interface unit according to claim 16, wherein the detecting unit comprises:
    a transistor to amplify the received first signal to produce the amplified first signal; and
    a resistor and/or a capacitor to change the waveform of the amplified first signal to form the second signal.

18. The line interface unit of according to claim 15, wherein:
    the insulating circuit comprises a transformer having a primary coil at the input side at which the network is connected, and a secondary coil electrically insulated from the network; and
    the first signal is output from the secondary coil.

19. The line interface unit of according to claim 18, wherein the secondary coil, to output the first signal, is connected in parallel to diodes to prevent a surge voltage, a capacitor to remove noise, and a resistor to match an input impedance.

20. The line interface unit of according to claim 19, wherein the primary coil is connected in series to a first capacitor and a first resistor to match the impedance of the communication line of the network.

21. The line interface unit of according to claim 15, wherein the second signal comprises a ring signal.

22. The line interface unit of according to claim 21, wherein:
    the insulating circuit comprises a transformer having a primary coil at the input side at which the network is connected, and a secondary coil electrically insulated from the network; and
    the first signal is output from the secondary coil.

23. The line interface unit of according to claim 22, wherein the secondary coil, to output the first signal, is connected in parallel to diodes to prevent a surge voltage, a capacitor to remove noise, and a resistor to match an input impedance.

24. The line interface unit of according to claim 23, wherein the primary coil is connected in series to a first capacitor and a first resistor to match the impedance of the communication line of the network.

25. A facsimile machine comprising the line interface unit of claim 15, the facsimile unit to receive the first signal and print the facsimile data; and the controller to set the operating mode of the facsimile unit to receive the facsimile data using the detected communication line based on the detected second signal.

26. A method of setting an operating mode of a facsimile unit, the method comprising:
    receiving at an input side of an insulating circuit a communication signal from a network;
    generating a first signal at an output side of the insulating circuit based upon the communication signal received at the input side, the input side being electrically insulated from the output side;
    detecting from the generated first signal a communication line through which facsimile data are sent across the network with respect to the facsimile unit;
    transforming the generated first signal into a second signal; and
    using the second signal to set an operating mode of the facsimile unit to receive the facsimile data using the detected communication line.

* * * * *

UNITED STATES PATENT AND TRADEMARK OFFICE
CERTIFICATE OF CORRECTION

PATENT NO. : 8,223,933 B2
APPLICATION NO. : 11/845192
DATED : July 17, 2012
INVENTOR(S) : Yun Tae Kim et al.

Page 1 of 1

It is certified that error appears in the above-identified patent and that said Letters Patent is hereby corrected as shown below:

In the Claims

In Col. 10, Line 5, In Claim 18, after "unit" delete "of".

In Col. 10, Line 12, In Claim 19, after "unit" delete "of".

In Col. 10, Line 17, In Claim 20, after "unit" delete "of".

In Col. 10, Line 21, In Claim 21, after "unit" delete "of".

In Col. 10, Line 23, In Claim 22, after "unit" delete "of".

In Col. 10, Line 30, In Claim 23, after "unit" delete "of".

In Col. 10, Line 35, In Claim 24, after "unit" delete "of".

Signed and Sealed this
Twenty-ninth Day of October, 2013

Teresa Stanek Rea
*Deputy Director of the United States Patent and Trademark Office*